March 30, 1926.
L. ROMERO
COOKING APPARATUS
Filed Oct. 26, 1925
1,579,147
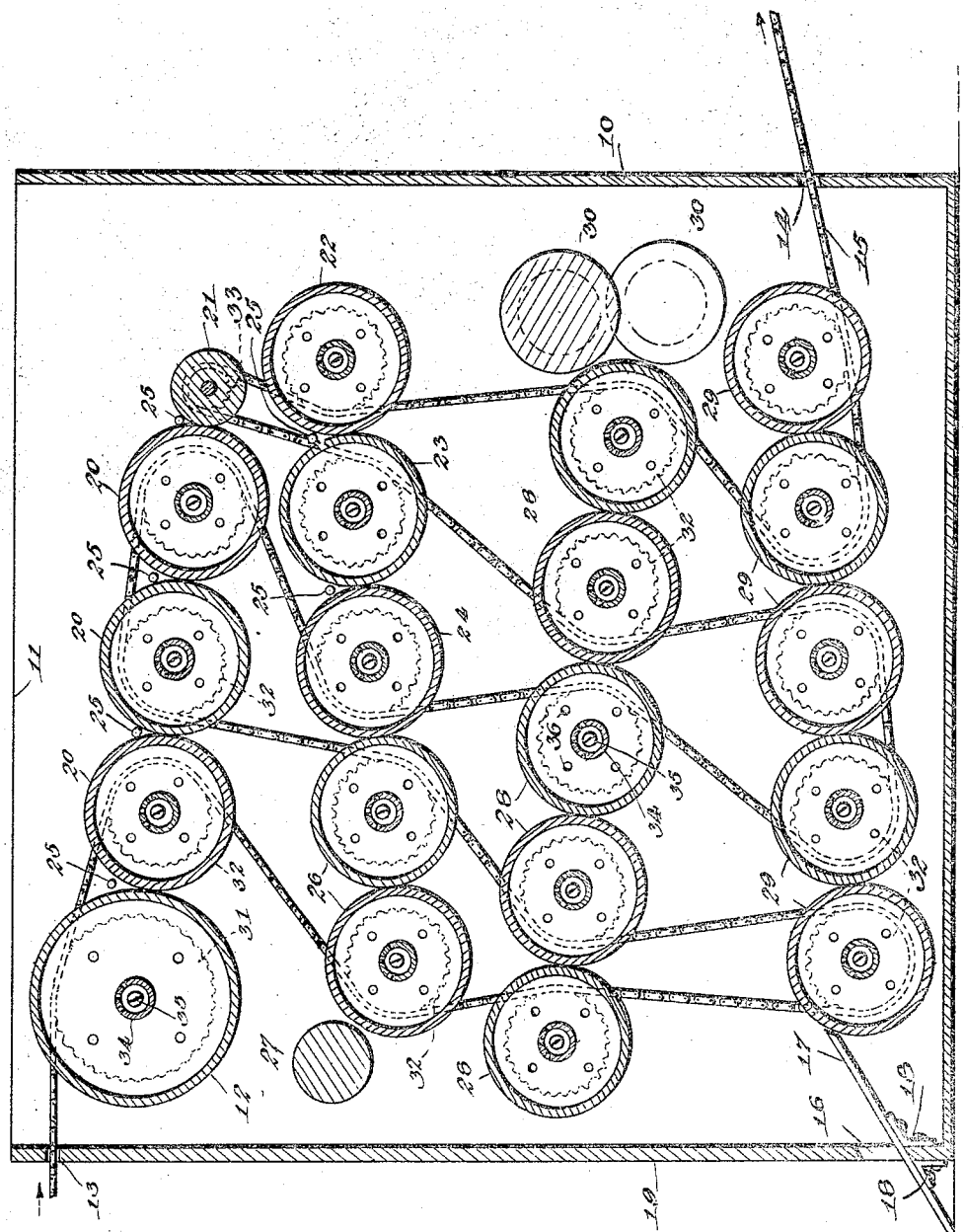
WITNESSES
INVENTOR
Luis Romero,
BY
ATTORNEYS Patented Mar. 30, 1926.

1,579,147

UNITED STATES PATENT OFFICE.

LUIS ROMERO, OF JUAREZ, MEXICO.

COOKING APPARATUS.

Application filed October 26, 1925. Serial No. 64,866.

*To all whom it may concern:*

Be it known that I, LUIS ROMERO, a citizen of Mexico, and a resident of Juarez, Mexico, have invented certain new and useful Improvements in Cooking Apparatus, of which the following is a specification.

This invention relates to a cooking apparatus and is more particularly directed to hot plates for baking tortillas.

Tortillas as is well known is a cake of disk form, about three sixteenths of an inch thick and from two to five or six inches in diameter and made of a corn dough called "masa". The cakes are baked on a hot plate, each side of the cake being baked separately.

It is an object of the present invention to provide a hot plate consisting of a plurality of heated rolls over which the cakes are forced to travel and at a point in the path the cakes are inverted so that both sides will be properly baked, provision being made to cause the cakes while in moist condition to move from one roll to another until the plastic state has been eliminated so that the cakes will conveniently pass the various roller hot plates.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:—

The figure is a vertical section of a hot plate constructed according to the principles of my invention.

Referring more particularly to the drawing, 10 designates a housing for supporting the various rolls and is provided with an opening 11 at its top for placing the uncooked cakes on a receiving roll 12. The housing has openings 13 and 14 through which a chain 15 travels. This chain is continuous and is driven in any approved manner by a mechanism, not shown. The housing has a discharge opening 16 through which is projected a slide 17 carried by brackets 18 secured to the front wall 19 of the housing.

Adjacent the hot roll 12 are a plurality of rolls or hot plates 20 which are of lesser diameter than the roll 12. The longitudinal axes of the rolls 20 are successively lowered so that the cakes will tend to travel at a slight incline towards a reversing roller 21 which turns the cake over before it is passed to rolls 22, 23 and 24. Between rolls 12 and 20, between the successive rolls 20, between the rolls 22, 23 and between the rolls 23 and 24 are rollers 25 having a relatively small diameter as compared to the adjacent cooperating rolls just enumerated and these rollers are adapted to lift the cakes which are in a more or less plastic state to the next succeeding hot plate or roll. Furthermore rollers 25 of which one is located in the space between the roller 21 and the adjacent roll 20 are disposed above the horizontal axes of the various rolls.

After the cakes have passed roll 20 they have been sufficiently baked to lose their plasticity and tendency to stick to the rolls so that rollers 25 may be dispensed with at this point. From roll 24 the cakes pass over a pair of rolls 26 and are then guided and reversed by roller 27 to a third series of heated rolls 28. Roller 27 is driven by frictional contact with the end roller 26.

From the rear end roll 28, the cakes are reversed and guided on a fourth series of hot rolls 29 by a pair of rollers 30 frictionally driven by contact with the rear roll 28. From the front end roll 29 the cakes are discharged completely baked upon the slide 17.

The chain 15 engages a sprocket 31 connected with roll 12 and sprockets 32 connected with the rolls of the four series of hot plates in the manner illustrated so that alternate series of the rolls will be driven in the same direction but in opposition to an adjacent series. The chain also engages a sprocket 33 connected with roller 21.

Each of the rolls is heated by a burner 34 supplied with fuel from a nozzle 35 and air from apertures 36 in the ends of the hollow rolls. The fuel may be an oil or gas or electricity may be employed as the heating agent and in case of fuel, all the burners may be supplied from a common source as a pipe.

The direction of rotation of the first or upper series of hot plates is indicated by arrows so that the cakes will be carried rearwardly of the housing. The next series of rolls not only return the cake to the forward end of the housing but bake the other side of the cake. The third series of rolls move the cake rearwardly while the last series return the cake to the slide 17. The last two series of rolls complete the baking process at opposite sides of the cake.

What I claim is:—

1. A cooking apparatus for cakes comprising a plurality of series of heated rolls, each series of rolls being arranged at various vertical heights, and inclined to the horizontal, means for revolving the rolls, the rolls in one series revolving in a direction which is opposite to the direction of rotation of an alternate series, a roller of relatively small diameter located in the spaces between the rolls of the top series and certain of the rolls of the next lower series, and driven rollers at the ends of each series of rolls but the last series for guiding the cakes for one series of rolls to the next series.

2. A cooking apparatus for cakes comprising a plurality of series of heated rolls, each series of rolls being arranged at various vertical heights, and inclined to the horizontal, means for revolving the rolls, the rolls in one series revolving in a direction which is opposite to the direction of rotation of an alternate series, a roller of relatively small diameter located in the spaces between the rolls of the top series and certain of the rolls of the next lower series, and driven rollers at the ends of each series of rolls but the last series for guiding the cakes for one series of rolls to the next series, the last mentioned rollers being spaced from an adjacent heated roll to permit the cakes to pass between said roller and the heated roll.

3. A cooking apparatus for cakes comprising a plurality of series of heated rolls, each series of rolls being arranged at various vertical heights, and inclined to the horizontal, means for revolving the rolls, the rolls in one series revolving in a direction which is opposite to the direction of rotation of an alternate series, a roller of relatively small diameter located in the spaces between the rolls of the top series and certain of the rolls of the next lower series, and driven rollers at the ends of each series of rolls but the last series, for guiding the cakes for one series of rolls to the next series, the heated rolls being in close contact with each other in a series and the first mentioned rollers being located above a plane passing through the longitudinal axes of a series of rolls.

4. A cooking apparatus for cakes comprising a plurality of series of heated rolls, each series of rolls being arranged at various vertical heights, and inclined to the horizontal, means for revolving the rolls, the rolls in one series revolving in a direction which is opposite to the direction of rotation of an alternate series, a roller of relatively small diameter located in the spaces between the rolls of the top series and certain of the rolls of the next lower series, and means for guiding the cakes from one series of rolls to the next lower series of rolls.

5. A cooking apparatus for cakes comprising a plurality of series of hollow rolls, each series of rolls being arranged at various vertical heights, and inclined to the horizontal, means for revolving the rolls, the rolls in one series revolving in a direction which is opposite to the direction of rotation of an alternate series, a roller of relatively small diameter located in the spaces between the rolls of the top series and certain of the rolls of the next lower series, means for guiding the cakes from one series of rolls to the next lower series of rolls, means for supplying air to the interior of the hollow rolls, and means for heating said hollow rolls.

LUIS ROMERO.